US011060506B2

(12) United States Patent
Rodway et al.

(10) Patent No.: US 11,060,506 B2
(45) Date of Patent: Jul. 13, 2021

(54) WIND TURBINE SYSTEM

(71) Applicant: Spinetic Energy Limited, Wiltshire (GB)

(72) Inventors: Giles Rodway, Wiltshire (GB); Kurt Joseph Joachim, Wiltshire (GB)

(73) Assignee: Spinetic Energy Limited, Chippenham Wiltshire (GB)

( * ) Notice: Subject to any disclaimer, the term of this patent is extended or adjusted under 35 U.S.C. 154(b) by 0 days.

(21) Appl. No.: 16/496,737

(22) PCT Filed: Mar. 29, 2018

(86) PCT No.: PCT/GB2018/050857
§ 371 (c)(1),
(2) Date: Sep. 23, 2019

(87) PCT Pub. No.: WO2018/178701
PCT Pub. Date: Oct. 4, 2018

(65) Prior Publication Data
US 2020/0318615 A1  Oct. 8, 2020

(30) Foreign Application Priority Data
Mar. 30, 2017 (GB) ..................................... 1705159

(51) Int. Cl.
*F03D 9/25* (2016.01)
*F03D 3/00* (2006.01)
*H02K 7/18* (2006.01)

(52) U.S. Cl.
CPC .............. *F03D 9/25* (2016.05); *F03D 3/005* (2013.01); *H02K 7/183* (2013.01)

(58) Field of Classification Search
CPC ... F03D 9/25; F03D 3/005; F03D 3/02; F03D 80/82; F03D 9/255; F03D 13/20;
(Continued)

(56) References Cited

U.S. PATENT DOCUMENTS 1,876,595 A * 9/1932 Beldimano ............... F03D 1/04
415/60
2,218,867 A * 10/1940 Beldimano ............... F03D 1/00
416/121

(Continued)

FOREIGN PATENT DOCUMENTS

ES        2576001 A    7/2016
GB        2476126      6/2011

OTHER PUBLICATIONS

International Search Report for Application PCT/GB2018/050857 dated Jun. 20, 2018.
(Continued)

*Primary Examiner* — Charles Reid, Jr.
(74) *Attorney, Agent, or Firm* — Honigman LLP

(57) ABSTRACT

A wind turbine system including a plurality of modules, each module including a frame and at least one wind turbine, a set of first electrically conductive members, and a set of second electrically conductive members. One of the first electrically conductive members is attached to a terminal of a generator and another of the first electrically conductive members is attached to another terminal of the generator to form a collection circuit configured to collect electricity generated by the turbine. The set of second electrically conductive members are connected to adjacent modules to form a concatenated string of second electrically conductive members to form a transmission circuit. The collected electricity is fed from the collection circuit to the transmission circuit along the concatenated string. At least one of the first electrically conductive members and at least one of the second electrically conductive members form structural rails of the frame.

15 Claims, 7 Drawing Sheets

(58) Field of Classification Search
CPC ........... F03D 1/02; H02K 7/183; Y02E 10/74; Y02E 10/72; Y02E 10/728; Y02E 10/76
USPC .................................................... 290/55, 44
See application file for complete search history.

(56) References Cited

U.S. PATENT DOCUMENTS

| | | | | |
|---|---|---|---|---|
| 4,165,468 | A * | 8/1979 | Fry | .......... F03D 13/20 |
| | | | | 290/55 |
| 4,220,870 | A * | 9/1980 | Kelly | ...... F03D 13/20 |
| | | | | 290/44 |
| 5,040,948 | A * | 8/1991 | Harburg | ..... F03D 1/02 |
| | | | | 416/85 |
| 5,328,334 | A * | 7/1994 | McCauley | ........ F03D 9/25 |
| | | | | 416/196 A |
| 5,642,984 | A * | 7/1997 | Gorlov | .......... F03B 17/061 |
| | | | | 416/176 |
| 7,576,443 | B2 * | 8/2009 | Raju | ........ H02J 4/00 |
| | | | | 290/40 F |
| 2008/0093861 | A1 | 4/2008 | Friesth et al. | |
| 2010/0295320 | A1 | 11/2010 | Bevirt et al. | |
| 2011/0049905 | A1 | 3/2011 | Khoshnevis | |
| 2013/0001950 | A1 * | 1/2013 | Armstrong | ............. F03D 3/005 |
| | | | | 290/55 |

OTHER PUBLICATIONS

UK Combined Search and Examination Report for Application GB1705159.0 dated May 26, 2017.
UK Examination Report for Application GB1705159.0 dated Feb. 28, 2018.

\* cited by examiner

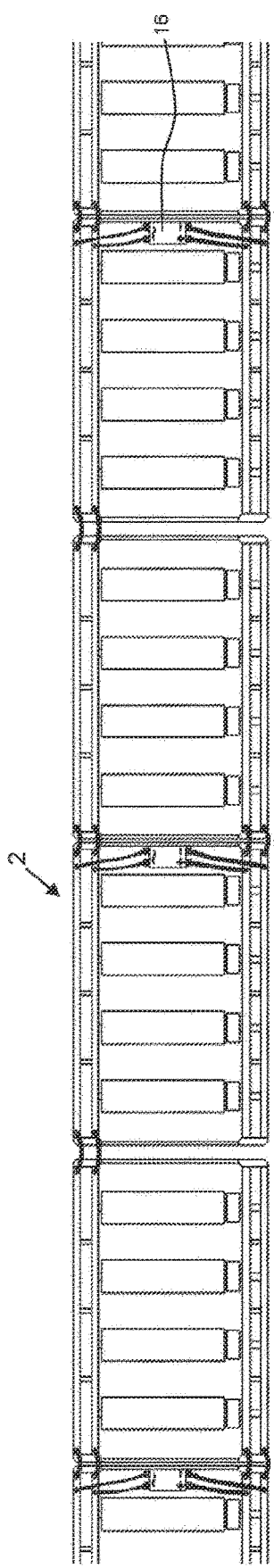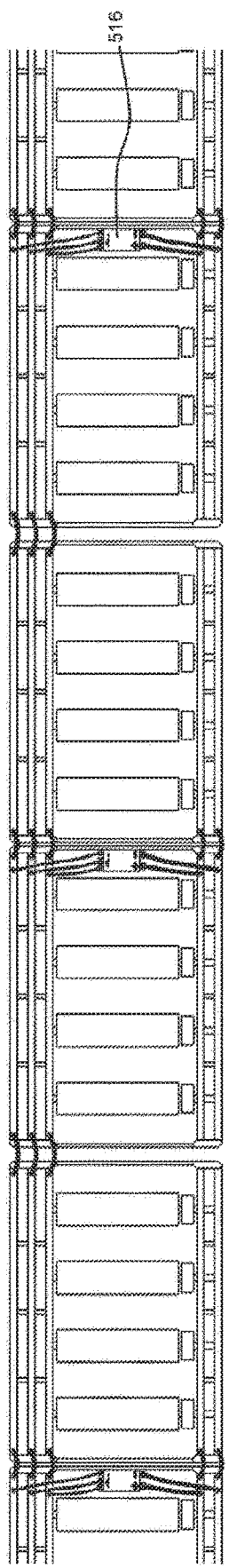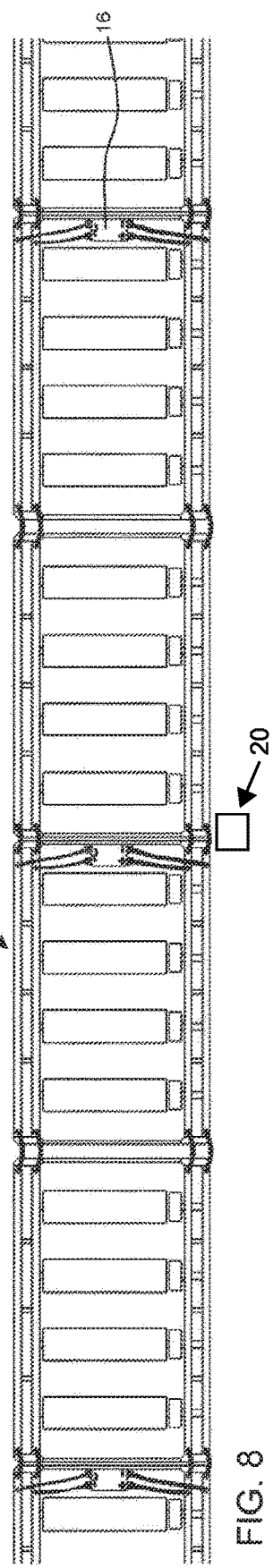
FIG. 6
FIG. 7
FIG. 8

WIND TURBINE SYSTEM

TECHNICAL FIELD

The invention relates to a wind turbine system.

BACKGROUND

It is known to connect a number of wind turbines to a power collection line which may then be fed to an end user or an electricity grid via a substation. For example, GB2476126 describes a modular system comprising a plurality of interconnected panel modules (referred to as "wind panels"). Each module comprises a frame which supports a plurality of wind turbine/generator units. The frame is formed by electrically conductive structural members, for example upper and lower members. The electrically conductive structural members not only mechanically support the turbine/generator units, but also form a circuit which carries power generated by the turbine/generator units. The modules may be electrically connected to form a network of concatenated wind panels which transmits the power to an end point for consumption or onward transmission.

However, there is a desire for a system which provides a more flexible electrical network.

In accordance with this disclosure, there is provided a wind turbine system which may be comprised of a plurality of modules, each module comprising a frame and at least one wind turbine supported by the frame; a set of first electrically conductive members; and a set of second electrically conductive members; wherein one of the first electrically conductive members is attached to a terminal of a generator of the at least one turbine and another of the first electrically conductive members is attached to another terminal of the generator such that the set of first electrically conductive members forms a collection circuit which is configured to collect electricity generated by the turbine; wherein the set of second electrically conductive members are connected to the set of second electrically conductive members of adjacent modules to form a concatenated string of second electrically conductive members which form a transmission circuit; wherein the set of first electrically conductive members are connected to the set of second electrically conductive members so as to feed the collected electricity from the collection circuit to the transmission circuit for transmission along the concatenated string of second electrically conductive members; wherein at least one of the first electrically conductive members and at least one of the second electrically conductive members form structural rails of the frame which supports the at least one turbine.

The set of first electrically conductive members may be connected to the set of first electrically conductive members of one or more adjacent modules to form a concatenated string of first electrically conductive members.

The concatenated string of first electrically conductive members may be formed by a subset of modules which form the concatenated string of second electrically conductive members.

The modules which form the concatenated string of second electrically conductive members may form a plurality of separate concatenated strings of first electrically conductive members and thus a plurality of collection circuits.

The separate concatenated strings of first electrically conductive members may be formed by pairs of modules.

The first electrically conductive members of adjacent modules may be connected in series.

The set of first electrically conductive members may comprise a return path member.

The or each collection circuit and the transmission circuit may carry different types of current and/or different voltages.

The set of first electrically conductive members may be connected to the set of second electrically conductive members via one or more power converters.

The or each power converter may be an inverter, transformer or DC-to-DC converter.

The or each power converter may receive the collected electricity from a collection circuit formed by a plurality of modules.

The or each power converter may be selectively activatable.

The or each power converter may be activated based on a voltage or current supplied by one or a plurality of the turbines (i.e. a load generated by the turbine or turbines), or based on wind speed.

The system may comprise a plurality of said power converters and the power converters may have different load capacities.

The set of first and/or second electrically conductive members may comprise three or more members which are configured to carry separate phases of a polyphase source.

The connection between the set of first electrically conductive members and the set of second electrically conductive members and/or the connection between the sets of first and/or second electrically conductive members of adjacent modules may comprise a plurality of configurations and the system may further comprise a controller which is configured to switch between the plurality of configurations of the connection.

BRIEF DESCRIPTION OF THE DRAWINGS

FIG. 6 is a front view of a wind turbine system formed using the module of FIG. 1;

FIG. 7 is a front view of a wind turbine system formed using the module of FIG. 5;

FIG. 8 is a front view of another wind turbine system formed using the module of FIG. 1 in which the lower rails of all modules are connected;

DETAILED DESCRIPTION

Figure 1:
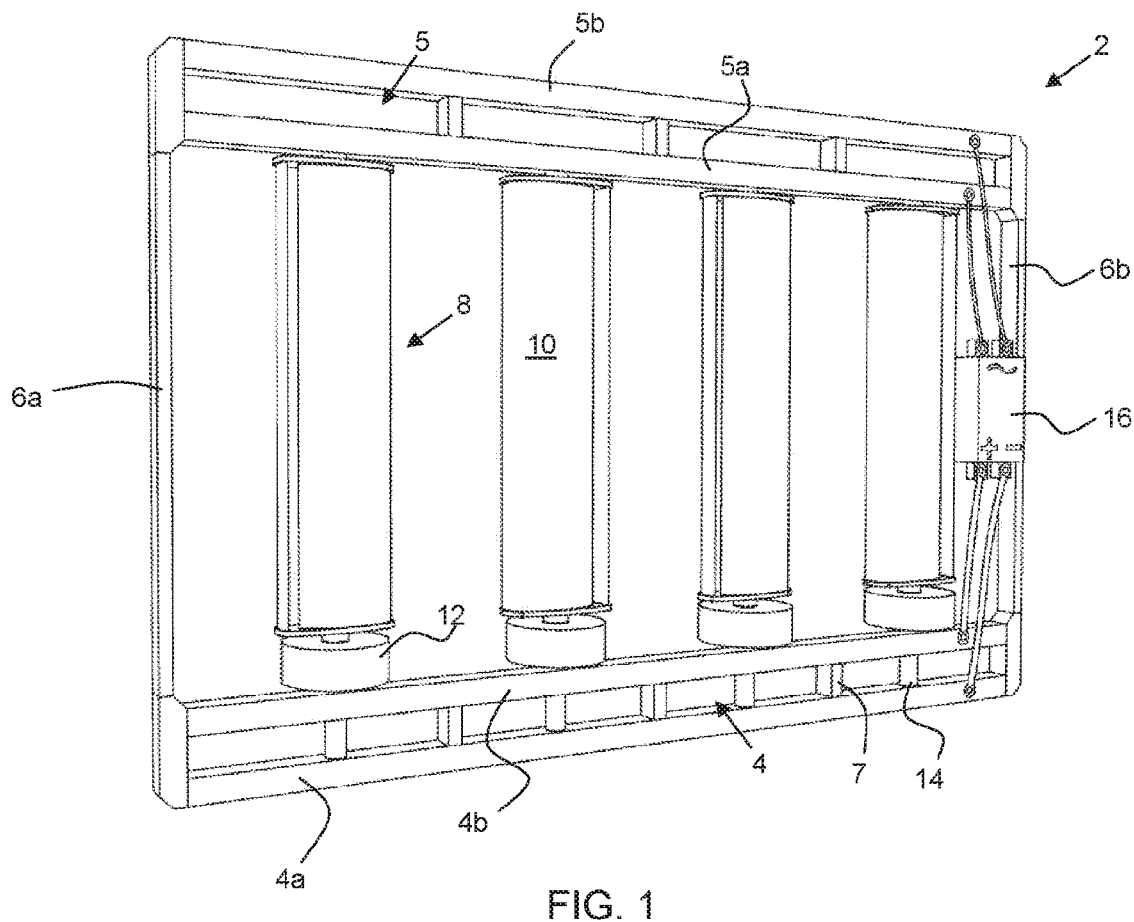
FIG. 1 is a perspective view of a wind turbine module of a system according to an embodiment of the invention in which the rails are arranged one above the other.

FIG. 1 shows a wind turbine module 2 (also referred to as a "wind panel") which may form part of a wind turbine system according to an embodiment of the invention (described further below).

The module 2 comprises a frame formed by a lower pair of electrically conductive structural rails 4a, 4b and an upper pair of electrically conductive structural rails 5a, 5b which are connected by a pair of upright rails 6a, 6b.

The lower pair of rails 4 are generally horizontal (or parallel to the ground) and parallel to one another with one rail positioned above the other. The lower pair 4 therefore form a lower rail 4a and an upper rail 4b. The upper rails 5 are also arranged in this manner and form a lower rail 5a and an upper rail 5b. The lower and upper pairs 4, 5 are thus also parallel to one another. The upright rails 6a, 6b extend in a generally vertical direction and form ties between the lower and upper pairs 4, 5. Accordingly, the rails of the lower and upper pairs 4, 5 all lie in a single plane which is oriented substantially vertically.

The lower and upper rails 4a, 4b of the lower pair 4 are separated from one another by a plurality of insulating spacer elements 7. The lower and upper rails 5a, 5b of the upper pair 5 are also separated by insulating spacer elements 7. As shown, an insulating spacer element 7 may be provided at either end of the lower and upper rails of both the lower and upper pairs 4, 5 and the upright rails 6a, 6b may connect the lower and upper pairs 4, 5 via these insulating spacer elements 7. Further, insulating spacer elements 7 may be provided at intervals along the length of the rails (three are shown). The lower and upper rails of each of the lower and upper pairs 4, 5 are thus electrically isolated from one another.

Disposed within the frame between the lower and upper pairs of rails 4, 5 are a plurality of vertical axis wind turbines 8 (four are shown, although this number may vary). Each turbine 8 comprises a rotatable blade portion 10 and a generator 12. The profile of the blade portion 10 may differ from that illustrated. The blade profile may, for example, be selected from a variety of known two bladed or three bladed designs, but preferably are of a "self-starting" design such that the turbine 8 can reach its optimum operating rate of rotation from the wind flow only, without an initial requirement for a driving motor to spin it up to speed. An example of a suitable profile for the blade portion 10 is described in U.S. Pat. No. 5,494,407. This profile is relatively efficient, strong, and straightforward to construct from lightweight sheet materials formed from, for example, aluminum or an aluminum alloy.

The position and spacing of the turbines 8 within the module 2 may be adjustable. This may allow the module to be customized to the specific installation location. In particular, the rails 4, 5 may be provided with a plurality of holes which allow the turbines 8 to be sited at a range of discrete positions. Alternatively, the turbines 8 may be mounted on sliding blocks or clamps which can be fixed at any desired position along the rails 4, 5.

The generator 12 sits between the upper rail 4b of the lower pair 4 and the blade portion 10 which is rotatably coupled at its upper end to the lower rail 5a of the upper pair 5. The generator 12 comprises a rotor (not shown) which is connected to the blade portion 10 for rotation therewith and a stator (not shown) which is stationary relative to the rotor. The generator 12 may be an axial or radial flux generator. In particular, the generator 12 may be a permanent magnet alternator unit comprising a rectifier so as to produce a direct current (DC) output. The rotor may comprise an array of magnets and the stator may comprise an array of generating coils, with the relative rotation between the rotor and stator generating a current in the coils.

Output terminals of the stator of the generator 12 are connected to the lower pair of rails 4. Specifically, the negative terminal of the stator is connected to the lower rail 4a and the positive terminal is connected to the upper rail 4b of the lower pair 4. The electrical connection may be made via a connector 14 which comprises a central pin or rod and an outer sleeve which receives the central pin but is electrically insulated from it. The central pin is connected to the negative output of the stator and the outer sleeve is connected to the positive output of the stator.

The central pin has a greater axial length than the outer sleeve such that a portion of the central pin extends out of the outer sleeve. The central pin engages with an opening formed in the lower rail 4a of the lower pair 4 and the outer sleeve engages with an opening formed in the upper rail 4b of the lower pair 4 to form separate electrical connections. As described previously, the lower and upper rails 4a, 4b are electrically insulated from one another and so form separate negative and positive rails, respectively.

As shown, a single-phase inverter 16 is provided between the lower and upper pairs of rails 4, 5. Specifically, the negative and positive input terminals of the inverter 16 are connected to the lower and upper rails 4a, 4b of the lower pair 4. The inverter 16 thus receives the DC output of the generators 12. The output terminals of the inverter 16 are connected to the lower and upper rails 5a, 5b of the upper pair 5. The inverter converts the DC output of the generators 12 into an AC output. The lower and upper pairs of rails 4, 5 thus form two distinct circuits or networks which operate in different modes with the lower pair 4 carrying DC and the upper pair 5 carrying AC.

The electrically conductive structural rails perform the combined functions of physically supporting an array of individual wind turbines and of conveying the electric power produced by the electrical generators.

Figure 2:
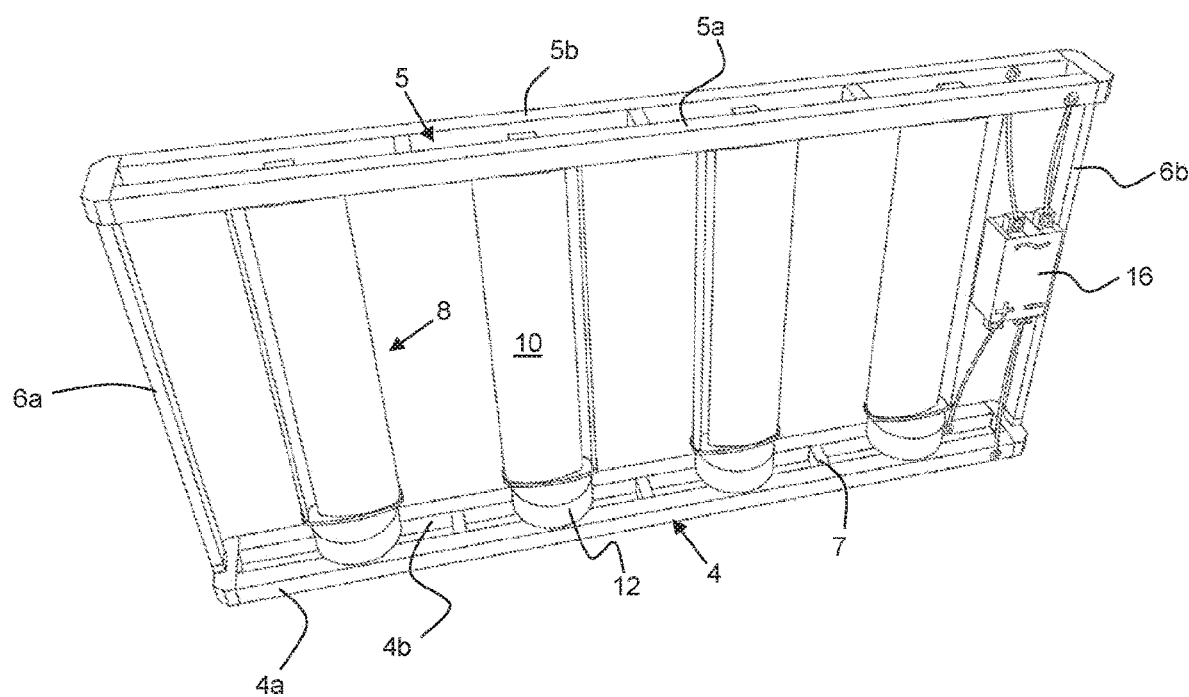
FIG. 2 is a perspective view of another wind turbine module of a system according to an embodiment of the invention in which the rails are arranged side-by-side.

As shown in FIG. 2, the lower pair of electrically conductive rails 4 may be arranged so that the rails 4a, 4b are provided side-by-side rather than one above the other. Likewise, the rails 5a, 5b of the upper pair 5 may be arranged side-by-side.

Figure 3:
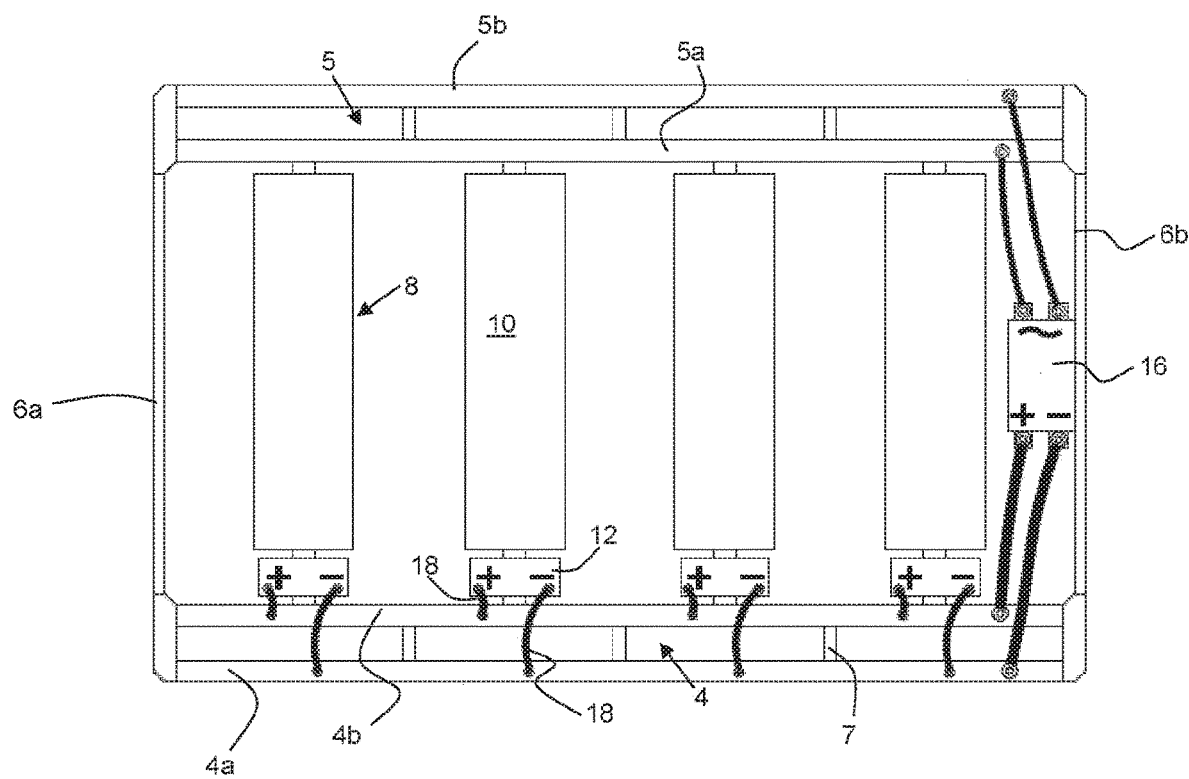
FIG. 3 is a front view of another wind turbine module of a system according to an embodiment of the invention in which cables are used to connect the generators to the lower rails.

FIG. 3 shows an alternative arrangement in which the output terminals of the generator 12 are connected to the lower and upper rails 4a, 4b of the lower pair 4 via short connecting cables 18 instead of connector 14.

Figure 4:
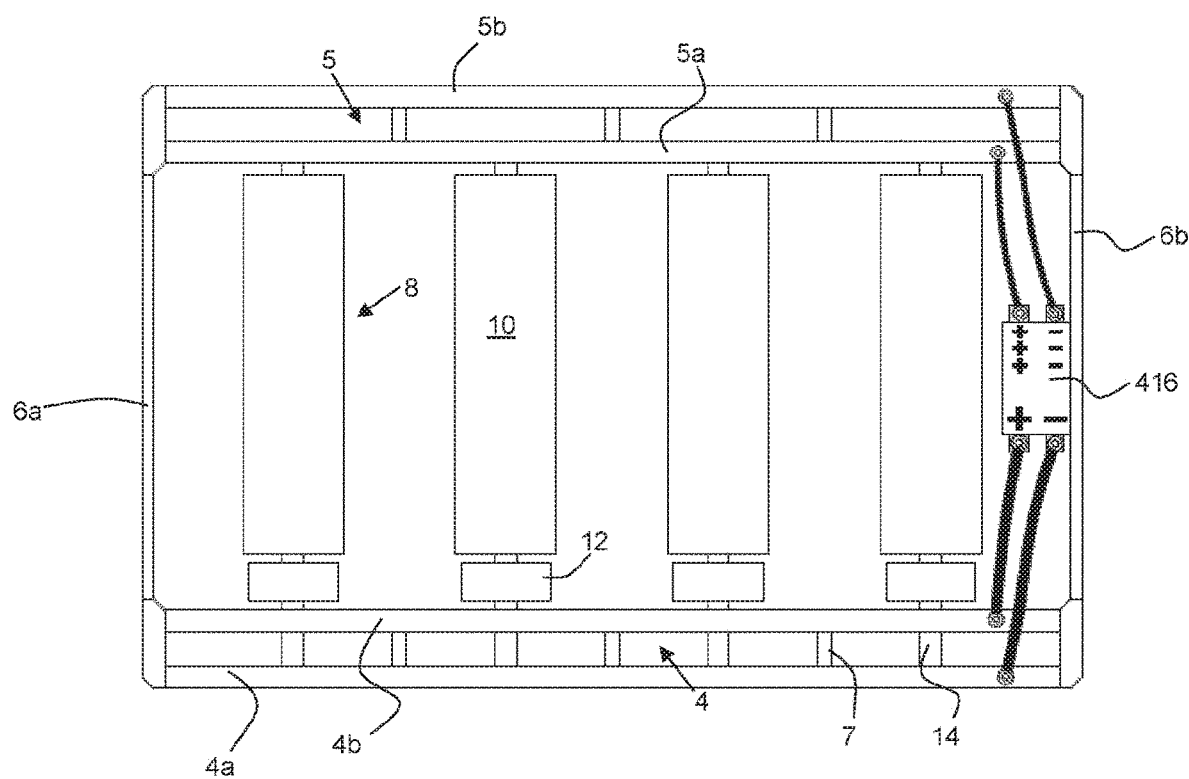
FIG. 4 is a front view of another wind turbine module of a system according to an embodiment of the invention which utilizes a DC-to-DC converter.

In the example of FIG. 4, a DC/DC converter 416 is used instead of inverter 16. The DC/DC converter is arranged in the same manner as the inverter with the negative and positive input terminals connected to the lower and upper rails 4a, 4b of the lower pair 4 and the positive and negative output terminals connected to the lower and upper rails 5a, 5b of the upper pair 5. The DC/DC converter 416 converts the DC output of the generator 12 into a higher voltage DC output.

Figure 5:
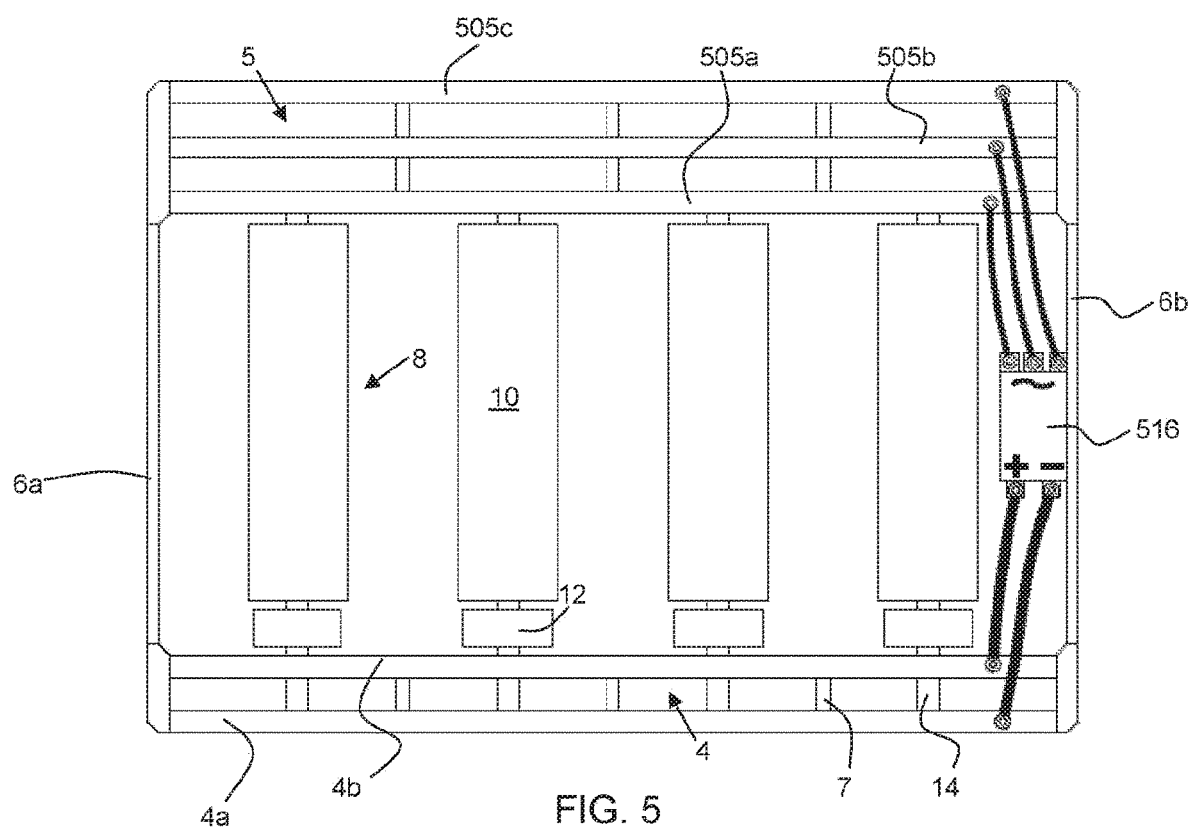
FIG. 5 is a front view of another wind turbine module of a system according to an embodiment of the invention which utilizes a three-phase inverter.

In the example of FIG. 5, a three-phase inverter 516 is used. Accordingly, the frame comprises three upper rails 505a, 505b, 505c which are connected to each output of the inverter 516. It will be appreciated that any number of electrically conductive structural rails may be used to match the numbers of phases of a polyphase output.

A plurality of modules as described previously may be connected to one another to form a wind fence, as described in GB2476126. The individual modules in the wind fence may be arranged such that they are perpendicular to the prevailing wind. The modules may also be arranged to account for the topography of the landscape.

FIGS. 6 to 10 show wind fences (otherwise referred to as wind turbine systems) formed using the modules described previously. The electrical connections formed between the individual modules differ in each of the wind fences and are designed to provide certain benefits, as described in detail below.

The wind fence of FIG. 6 is formed by a plurality of modules 2, as described previously with respect to FIG. 1. The upper pair of rails 5 of each module 2 is electrically connected in parallel to the upper pair of rails 5 of the adjacent module or modules 2. The upper pairs of rails 5 are therefore connected to form a concatenated string of rails. The rails 5 may be connected in any suitable manner, such as using short flexible jumper cables, as illustrated, or short structural connecting rails.

In contrast, the lower pairs of rails 4 are not all connected to one another. Instead, short runs are formed of modules 2 which have their lower pairs of rails electrically connected in parallel, but which are isolated from the neighboring modules 2 either side. Specifically, as shown in FIG. 6, the lower pair of rails 4 of adjacent pairs of modules 2 are electrically connected to one another. The lower pairs of rails 4 of each pair of modules 2 is electrically isolated from the adjacent pairs lying either side.

Consequently, the upper pairs of rails 5 are connected in a long run and the lower pairs of rails 4 are connected in shorter runs formed by a subset of the plurality of modules 2 in the wind fence. As shown, one of each pair of modules 2 is provided with a single-phase inverter 16. As described previously, the single-phase inverter 16 is provided between the lower and upper pairs of rails 4, 5. The inverter 16 thus receives the DC output of the generators 12 of both of the modules 2 and converts this into an AC output.

The inverters 16 feed higher voltage, but lower current AC to the upper rails 5. The inverters 16 are of a "grid tie" type so that they produce AC electricity in phase with one another.

As shown in FIG. 7, three-phase inverters 516 (as per the module shown in FIG. 5) may be used to convert the DC output of the generators 12 connected along the short string of concatenated lower rails 4 into a three-phase AC output which is fed into the longer string of concatenated upper rails 5.

It will be appreciated that the string of upper rails 5 may be supplied by outputs from the lower rails 4 of one or more modules 2 and is not limited to the paired arrangement described previously. The number of modules 2 having their lower rails 4 connected may depend on details of the system currents generated, rail materials, lengths, cross-sectional areas etc.

Alternatively, DC-to-DC converters could be used in place of inverters (as described with reference to FIG. 4), if a higher voltage DC output on the upper rails 5 was preferable to AC for the system in question.

It is not necessary for all of the modules 2 in the wind fence to have their upper rails 5 connected to one another and several shorter runs of upper rails 5 may be formed. These runs may, however, be longer than the runs of lower rails 4 fed by the generators 12.

The lower pairs of rails 4 may instead carry single phase AC power (if a non-rectified AC generator output is used, and some form of synchronization is employed, to ensure the generator outputs are in phase with one another), or polyphase AC power using more than two rails.

Regardless of whether the current in either the lower or upper rail pairs is AC or DC, by limiting the length of the low voltage, high current sections of the system (and hence the number of generators feeding them), a configuration as described above prevents excessively high currents building up in the lower pairs of rails 4. This arrangement therefore avoids excessive ohmic losses or overheating of these lower voltage parts of the system. The higher voltage parts of the system operate at lower current levels for the same power transmission and so the electrically interconnected runs of upper pairs of rails 5 carrying higher voltage may be much longer, and carry much more power (i.e. they can carry the power output from multiple low voltage sections, provided it is first stepped up to sufficiently high voltages), before ohmic losses or overheating become unacceptable. For example, if the lower pairs of rails 4 operate at a voltage of 50V and a have a current carrying capacity of 100 A, and the upper pairs of rails 5 operate at 500V, a run of connected upper rails 5 can be 10 times as long as a run of lower rails 4 before they reach the 100 A capacity.

FIG. 8 shows another wind fence formed by a plurality of modules 2. The wind fence of FIG. 8 is similar to that of FIG. 6 except that the lower pairs of rails 4 are also electrically connected in parallel to the lower pair of rails 4 of the adjacent module or modules 2 to form a concatenated string of rails, instead of blocks of two modules. However, as per the system of FIG. 6, every other module 2 is provided with an inverter 16 which draws off current at regular intervals along the string of lower rails 4. Consequently, there is no excessive build-up of current along any portion of the string of lower rails 4.

This configuration has the advantage that, if an inverter 16 were to fail, the neighboring inverters 16 should, under most operating conditions, still be able to accept and convert the power output from the run of modules 2 normally serviced by the failed inverter 16. It has the further advantage that for low wind speed conditions some of the inverters 16 may deliberately be switched off altogether, allowing those inverters which remain operational to handle the power output from more turbines 8. Inverters are typically more efficient when operating at higher proportions of their rated capacity and so this may improve the efficiency of the system under such conditions. It may also allow different types or differently programmed inverters to handle the power output under low load conditions from those which handle the power output under high load conditions. Equally, other systems may be switched in or switched out (battery storage, DC-to-DC converters, resistive dump loads, etc.) under different operating conditions when all the lower pairs of rails 4 are linked together. The power converter or other systems may be selectively activated (i.e. switched on or off) based on a voltage or current being supplied by an individual turbine, plurality of turbines within a module or across several modules which exceeds a threshold, or based on some other parameter, such as wind speed. The lower pairs of rails 4 may, in addition to carrying DC power, be able to carry control signals, thus enabling the inverters and other equipment to be controlled directly. Such signals could also be carried by the upper pairs of rails 5.

Figure 9:
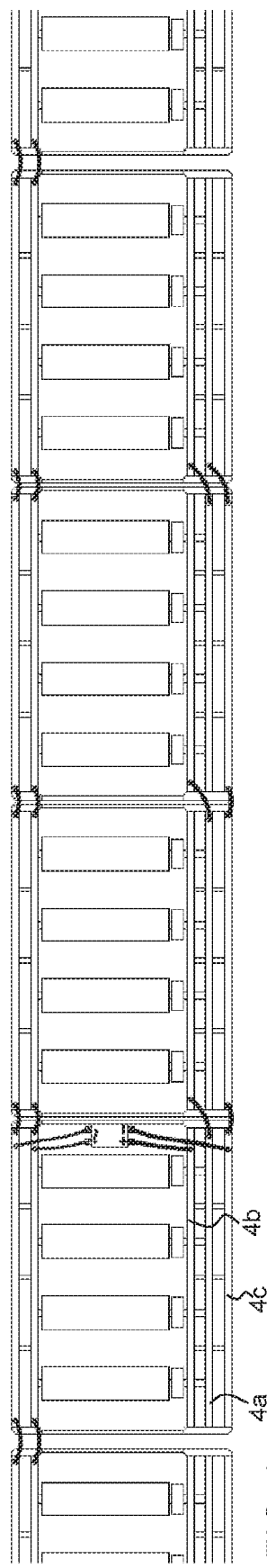
FIG. 9 is a front view of another wind turbine system according to an embodiment of the invention in which the lower rails are connected in series with a separate return path.

FIG. 9 illustrates a system in which the lower pairs of rails 4 are not connected in parallel as described previously, but in series. In the example shown in FIG. 9, the lower pair of rails 4 of four adjacent modules 2 are connected in series. To allow this, an additional return rail 4c (or other conductor) is provided and the modules 2 generate a DC output or an AC output which is synchronized with its neighbors. The negative lower rail 4a of the lower pair 4 is connected to the positive upper rail 4b of the lower pair 4 of an adjacent module. This is repeated until the final module 2 in the series, where the negative lower rail 4a of the lower pair 4 is connected to the return rail 4c. The negative input of the inverter 16 is connected to this return rail 4c.

This series connection configuration has the advantage that the voltage supplied to each inverter 16 is raised, and therefore lower voltage generators 12 may be used within each module 2, whilst allowing the overall voltage output from a string of series-connected generators 12 to be within the acceptable input voltage range for the inverter 16 in question.

Figure 10:
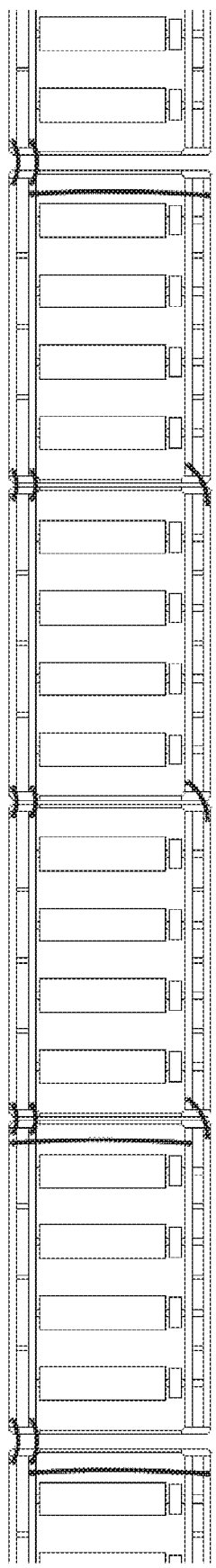
FIG. 10 is a front view of another wind turbine system according to an embodiment of the invention in which the lower rails are connected in series without a separate return path.

The upper pairs of rails 5 may be supplied directly by outputs from strings of series-connected lower rails 4 without any inverter or other power converter. As a result, the current carried by the lower and upper pairs of rails 4, 5 is of the same type (i.e. DC or AC). To allow the upper pairs of rails to carry AC power, the modules 2 may be mechanically or electrically controlled so as to provide a synchronized AC output. As shown in FIG. 10, where a power converter is not required, the return rail or cable can be omitted by connecting the negative lower rail 4a of the lower pair 4 of the final module 2 in the series directly to the lower rail 5a of the upper pair 5.

The independent circuits formed by the upper and lower rails 4, 5 in the systems described above may be used to provide various characteristics based on the manner in which power is supplied from one circuit to the other (e.g. depending on the type of power converter used or the manner in which the modules are connected).

In particular, the invention may provide:

(i) the ability to step up the voltage output from individual modules or short strings of electrically interconnected modules so as to provide a higher voltage and therefore lower current, thus minimizing power transmission losses within a long string of electrically interconnected modules;

(ii) the ability to carry AC and DC on separate rails within a string of electrically interconnected modules; and/or (iii) a means of optimizing the output of short runs of modules via, for example, individually controlled inverters, whilst conveniently collecting power from a long linear run or a branched/interconnected network of modules.

The arrangement allows one circuit (which connects directly to the generators) to be utilized for short-distance transmission of power and the other circuit to be utilized for longer distance transmission of power along a longer, or full, run or network of panels. The circuits may therefore act as a collection circuit and a distribution or transmission circuit. The electrically conductive rails also form part of the structural frame which is capable of mechanically supporting the turbines to form a panel. This is achieved whilst avoiding the additional cost and complexity of long runs of cabling, and avoiding cable mounting or trenching operations, by the above described means of redesigning and making fuller use of the structural framework which supports the wind turbines themselves.

With reference to FIG. 8, the systems described above may be provided with active controllers 20, such as switches or relays, which allow the connections between the lower and upper rails and between the lower and/or upper rails of adjacent modules to be reconfigured during operation. In particular, such controllers 20 may provide the ability to switch the lower and/or upper rails between series and parallel connection or to open or close electrical links between individual modules (via either the lower or upper rails).

Such controllers may therefore be used to provide various benefits, such as controlling the collection or transmission voltage range of a string of modules. For example, under low wind speed conditions, a group of modules might be connected in series, whereas they might be connected in parallel under higher wind speed conditions. The controller may therefore be used to provide better matching with an inverter's input voltage range.

Similarly, different lengths of strings might be connected in series to control overall voltage, or in parallel to control overall current, depending on, for example, wind conditions. Furthermore, the ability to isolate groups of modules from the rest of a string or network of modules could be useful if a fault or damage occurred in part of the network, if a set of modules needed to be electrically isolated from the network for maintenance, or if the overall power output of the network needed to be limited for some reason (e.g. during very strong winds). The controllers may be remotely controlled to allow the network to be managed centrally and may be controlled automatically based on sensed conditions, such as current, voltage, turbine speed, wind speed, etc.

The systems described above have been described primarily with respect to an inverter. However, it will be appreciated that other types of power converter (switching between AC and DC or changing a voltage) may be used in these systems, where appropriate.

Although the frame has been described as being formed by a plurality of rails, it will be appreciated that the term "rail" may encompass any form of electrically conductive structural member such as metal rails, tubes, beams, bars, girders or other known structural forms. Further, one or more of the rails as described above may be replaced with another electrically conductive member, such as a cable. For example, a three-phase system may comprise three rails, two rails and one cable, or one rail and two cables.

The rails may be fabricated from aluminum, or an alloy containing a high proportion of aluminum. Aluminum and many of its alloys possess the desirable characteristics of having both high strength to weight ratios, and very high ratios of electrical conductivity to both weight and cost compared to other known materials, making them ideal for structures such as those of the present invention, which need to be strong, light in weight, low in cost, and highly electrically conductive. Aluminum and its alloys are also readily available as extruded lengths with many cross-sectional forms suitable for the application described in the present invention, such as box sections, beams and tubes. Additionally, they generally possess very good corrosion resistance, therefore not requiring painting or maintenance in outdoor applications such as the ones envisaged in the present invention.

The arrangement of the circuits may be reversed so that the upper rails collect power from the generators of the module(s) and the lower rails transmit this for consumption. This may be achieved by locating the generator above the blade portion instead of below.

Other configurations of rails are also envisaged. For example, the two circuits (i.e. a higher and lower voltage run of rails) may share a common rail or cable, and many additional configurations are possible within the scope of this invention.

Although the generator has been described as being driven directly by the blade portion of the turbine, other arrangements may be used where the generator is driven indirectly via gears or other means. Multiple blades may also drive a single generator or a single blade may provide drive to multiple generators.

The invention claimed is:

1. A wind turbine system, comprising:
a plurality of modules, each module including a frame and at least one wind turbine supported by the frame;
a set of first electrically conductive members; and
a set of second electrically conductive members;
wherein one of the first electrically conductive members is attached to a terminal of a generator of the at least one wind turbine and another of the first electrically conductive members is attached to another terminal of the generator such that the set of first electrically conductive members forms a collection circuit which is configured to collect electricity generated by the at least one wind turbine;
wherein the set of second electrically conductive members are connected to the set of second electrically conductive members of adjacent modules to form a concatenated string of second electrically conductive members which form a transmission circuit;
wherein the set of first electrically conductive members are connected to the set of second electrically conductive members so as to feed the collected electricity from the collection circuit to the transmission circuit for transmission along the concatenated string of second electrically conductive members;
wherein at least one of the first electrically conductive members and at least one of the second electrically conductive members form structural rails of the frame which support the at least one wind turbine, and wherein the collection circuit and the transmission circuit carry different types of current and/or different voltages.

2. The system as claimed in claim 1, wherein the set of first electrically conductive members are connected to the set of first electrically conductive members of one or more adjacent modules to form a concatenated string of first electrically conductive members.

3. The system as claimed in claim 2, wherein the concatenated string of first electrically conductive members is formed by a subset of modules which form the concatenated string of second electrically conductive members.

4. The system as claimed in claim 2, wherein the modules which form the concatenated string of second electrically conductive members form a plurality of separate concatenated strings of first electrically conductive members and thus a plurality of collection circuits.

5. The system as claimed in claim 4, wherein the separate concatenated strings of first electrically conductive members are formed by pairs of modules.

6. The system as claimed in claim 4, wherein the first electrically conductive members of adjacent modules are connected in series.

7. The system as claimed in claim 6, wherein the set of first electrically conductive members includes a return path member.

8. The system as claimed in claim 1, wherein the set of first electrically conductive members are connected to the set of second electrically conductive members by way of one or more power converters.

9. The system as claimed in claim 8, wherein one or more of the one or more power converters is an inverter, transformer or DC-to-DC converter.

10. The system as claimed in claim 8, wherein one or more of-the one or more power converters receives the collected electricity from the collection circuit formed by the plurality of modules.

11. The system as claimed in claim 8, wherein one or more of the one or more power converters is selectively activatable.

12. The system as claimed in claim 11, wherein one or more of the one or more power converters is activated based on a voltage or current supplied by at least one of the at least one wind turbine, or based on wind speed.

13. The system as claimed in claim 11, wherein one or more of the one or more power converters have different load capacities.

14. The system as claimed in claim 1, wherein the set of first and/or second electrically conductive members includes three or more members which are configured to carry separate phases of a polyphase output.

15. The system as claimed in claim 1, wherein the connection between the set of first electrically conductive members and the set of second electrically conductive members and/or the connection between the sets of first and/or second electrically conductive members of adjacent modules includes a plurality of configurations and wherein the system further includes a controller which is configured to switch between the plurality of configurations of the connection.

* * * * *